(12) United States Patent
Billick et al.

(10) Patent No.: US 6,807,629 B1
(45) Date of Patent: Oct. 19, 2004

(54) APPARATUS AND METHOD FOR ACCESSING POST 80H CODES VIA A COMPUTER PORT

(75) Inventors: Stephen J. Billick, Austin, TX (US); Mark Joseph Palasz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/570,984

(22) Filed: May 15, 2000

(51) Int. Cl.$^7$ .......................................... G06F 15/177
(52) U.S. Cl. ........................................... 713/2; 710/62
(58) Field of Search .................. 713/1, 2, 400, 713/401, 600; 710/62, 58, 100; 714/25

(56) References Cited

U.S. PATENT DOCUMENTS

| | | | |
|---|---|---|---|
| 5,535,330 A | | 7/1996 | Bell |
| 5,850,562 A | * | 12/1998 | Crump et al. .................. 713/1 |
| 5,974,546 A | * | 10/1999 | Anderson ....................... 713/2 |
| 6,535,988 B1 | * | 3/2003 | Poisner ......................... 713/500 |
| 6,546,450 B1 | * | 4/2003 | Liu ............................. 710/316 |

OTHER PUBLICATIONS

IBM TDB—"Displaying Detailed Power–On–Self–Test (POST) Errors"—Oct. 1, 1993—vol. 36—pp. 7-8.*
Peter H. Wendt—Reading CP–Codes from LPT–port [on line]—Sep. 5, 1999 [Retrieve on Feb. 28, 2003]. Retrieved from the Internet: <URL: http: / / members.aol.com/mcapage0/cpreader.htm>.*

Helmut P. Einfalt—Non–booting PC [on line]—Jan. 24, 2000. Retrieved from the Internet on Feb. 28, 2003.*

Martin Lytz—80386 ICE Recommendation [on line]—May 28, 1999. Retrieved from the Internet on Feb. 28, 2003.*

Peter Wendt—And Even More "Weird Science": Reading CP–codes etc. [on line]—Sep. 3, 1999. Retrieved from the Internet on Feb. 28, 2003.*

Latino—MCS–700 Problems [on line]—Sep. 25, 1999. Retrieved from the Internet on Feb. 28, 2003.*

* cited by examiner

*Primary Examiner*—Lynne H. Browne
*Assistant Examiner*—Thuan Du
(74) *Attorney, Agent, or Firm*—Haynes and Boone, LLP

(57) ABSTRACT

An apparatus and method for accessing POST 80h codes using a USB or other port of a computer are described. In one embodiment, POST 80h data is sent in a serial format to a general purpose I/O ("GPIO") port of the computer. This data is output from the GPIO port on one of the data lines (e.g., D+) of the USB port. Additionally, a soft clock is output from the GPIO port on another of the data lines (e.g., D−) of the USB port. An external plug-in device is connected to the USB port via an appropriate connector for receiving the POST 80h data and clock signals and displaying the POST 80h codes on several seven segment display elements thereof. In an alternative embodiment, the data output via the USB port is read into a portable device and transmitted to a technical center for review and analysis.

13 Claims, 2 Drawing Sheets

APPARATUS AND METHOD FOR ACCESSING POST 80H CODES VIA A COMPUTER PORT

BACKGROUND

The disclosures herein relate generally to detection of POST 80h codes in a personal computer and, more particularly, to a system and method for accessing such codes using a universal serial bus ("USB") or other port of a computer.

During the boot-up and power-on self-test ("POST") sequence of a computer, many tasks are executed, each of which must be successfully completed before the computer may be used. Once the video system is initialized, the progress of the boot-up sequence can be communicated using error and other messages displayed on the display of the computer. Specifically, if the computer "hangs" prior to successful completion of the boot-up sequence, but subsequent to the initialization of the video system, an error message detailing the failure will be displayed, thereby facilitating the troubleshooting process.

Additionally, each POST task executed by a computer during boot-up thereof is assigned an 8-bit POST code that is written to I/O address 0080h ("port 80h") prior to execution of the associated task. If the computer fails to boot-up properly prior to initialization of the video system, the last POST code issued can be examined to determine what task caused the computer to "hang". One method of accessing the POST codes involves installation of a special expansion card, commonly referred to as a POST 80h card. Installation of a POST 80h card requires removal of the cover of the computer chassis and installing the card in one of the expansion slots provided within the chassis. Generally, installation and configuration of a POST 80h card is beyond the expertise of most computer users.

Other methods exist for diagnosing computer board-level problems, such as logic analyzers, in-circuit analyzers, oscilloscopes, and diagnostic LEDs. However, each of these methods is expensive and requires user-intervention to determine the cause of the problem.

Therefore, what is needed is an apparatus and a method for enabling POST 80h codes to be more easily accessed.

SUMMARY

One embodiment, accordingly, provides an apparatus and method for accessing POST 80h codes, or data, using a USB port of a computer. To this end, a computer includes a processor connected to a memory device via one or more buses. During boot up of the computer, generated POST 80h codes, are accessed. This is accomplished by outputting the POST 80h codes via a serial port of the computer by connecting to the serial port for receiving the POST 80h codes.

A technical advantage achieved is that, because the USB-defined signaling protocol is not used, it is unnecessary for the USB port and USB controller to be up and running to output the POST 80h codes. As a result, POST 80h codes can be accessed without requiring a user to install an expansion card within the chassis of a computer. In addition, POST 80h codes are available almost instantaneously via the display of an external plug-in device.

BRIEF DESCRIPTION OF THE DRAWING FIGURES

DETAILED DESCRIPTION

Figure 1:
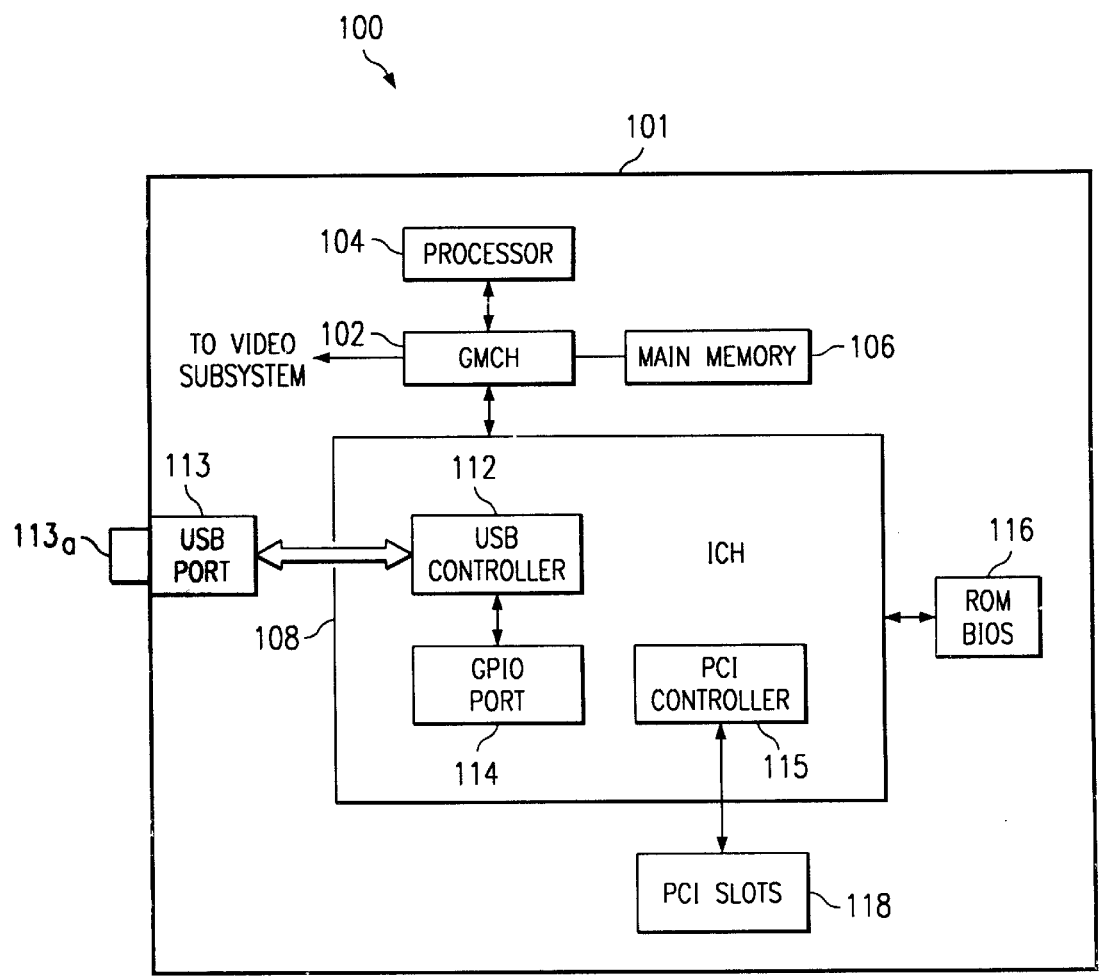
FIG. 1 is a block diagram of a computer system embodying features of one embodiment.

FIG. 1 is a block diagram of a computer 100 including features of one embodiment. As shown in FIG. 1, disposed within a chassis 101 of the computer 100 is a graphics memory controller hub ("GMCH") 102 connected to a processor 104 and main memory 106 for generating graphics data and control signals to a monitor (not shown) connected to the computer 100. The GMCH 102 is further connected to an input/output controller hub ("ICH") 108 that includes, among other things, a USB controller 112, connected to a USB port 113, having a USB port connector 113a disposed through a wall of the chassis 101, at least one GPIO port 114, and a PCI controller 115. The ICH 108 is further connected to a ROM BIOS 116, which contains, among other things, instructions for implementing POST of the computer 100, and is also connected to a plurality of PCI slots 118 via the PCI controller 115.

Figure 2:
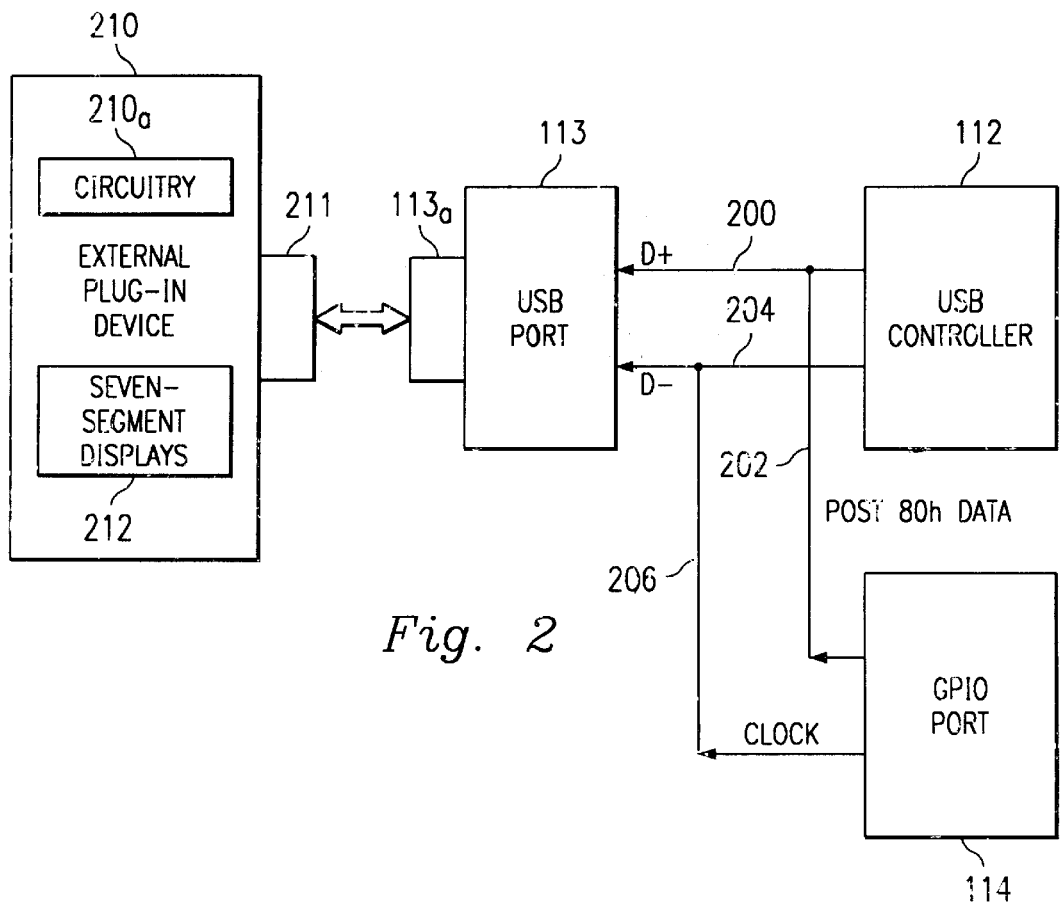
FIG. 2 is a more detailed block diagram of a portion of the computer system of FIG. 1 for implementing one embodiment.

FIG. 2 is a more detailed block diagram of a portion of the computer 100 of FIG. 1 for implementing the preferred embodiment. As shown in FIG. 2, instructions included in the ROM BIOS 116 cause the POST 80h codes to be written to the GPIO port 114. The codes are output to the USB connector 113a on a data output line 200 (e.g., D+) of the USB controller 112 via a data output line 202 of the GPIO port 114. Similarly, a soft clock signal is output to the USB connector 113a via second data output line 204 (e.g., D–) of the USB controller 112 via a clock line 206 of the GPIO port 114. In one embodiment, an external plug-in device 210 connected via a complementary connector 211 to the USB port connector 113a displays the POST 80h codes as they are output via the USB connector. In a preferred embodiment, the device 210 includes appropriate circuitry 210a for displaying the POST 80h codes on several seven segment displays 212 such that it is capable of displaying up to 255 different POST 80h codes. In alternative embodiments, other types of display devices may be used to enable the device 210 to display more or fewer than 255 codes, as desired. Although not shown, it will be recognized that power and ground signals may be provided to the device 210 via the USB port connector 113a.

It should be noted that, because only the physical interface between the USB port controller 112 and USB port 113, and not the USB-defined signaling protocol, is used to communicate the POST 80h codes to the device 210, which is not a USB device, it is not necessary for the USB port 113 to be initialized before the embodiment can be used. This is advantageous, as the USB port 113 is not generally initialized until late in the boot-up sequence.

It should also be noted that the connections between the GPIO 114 and the USB port 113 can be made either internal or external to the chip on which the ICH 108 resides.

Figure 3:
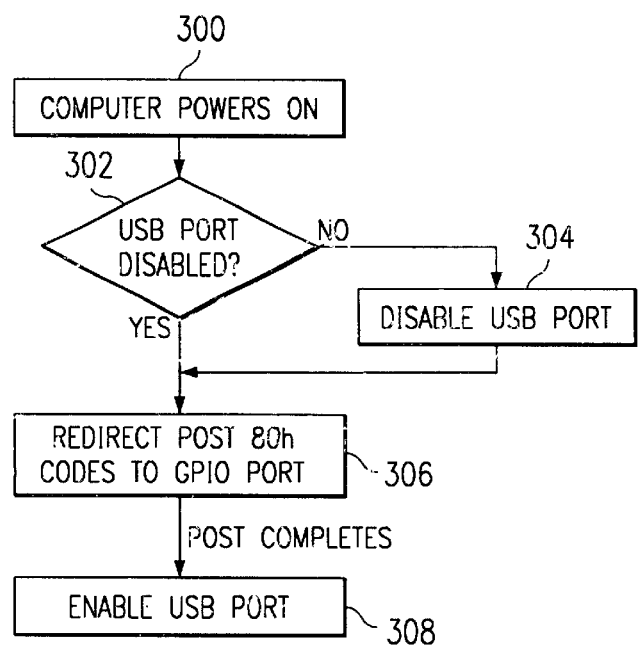
FIG. 3 is a flowchart illustrating operation of one embodiment.

FIG. 3 is a flowchart of the operation of the embodiment described above with reference to FIGS. 1 and 2. In step 300, the computer 100 is powered on. In step 302, a determination is made whether the USB port 113 has been disabled. This step is necessary because non-USB protocol data (i.e., POST 80h codes) is to be transmitted via the USB port 113. If it is determined that the USB port 113 has not been disabled, execution proceeds to step 304, in which the USB port is disabled by setting a bit in a configuration register in the ICH 108. Execution then proceeds to step 306, in which the POST 80h codes are redirected to the GPIO port 114 in a serial format. If in step 302 it is determined that the USB port 113 has already been disabled, execution proceeds directly to step 306. Upon completion of initialization of the video system, execution proceeds to step 308, in which the USB port 113 is enabled for conventional use.

It should be noted that similar embodiments may be implemented for other types of I/O ports, wherein the port is used merely as a conduit for POST 80h data to a plug-in device connected thereto. Additionally, it is anticipated that devices other than display devices may be substituted for the device 210; for example, a portable device may be connected to the USB port 113 for storing the POST 80h data for subsequent download and analysis. Additionally, the circuitry 210a may include a memory device for storing the POST 80h codes output thereto.

Although illustrative embodiments have been shown and described, a wide range of modification, change, and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer comprising:

a processor;

a main memory connected to the processor;

a graphics memory controller hub (GMCH) connected to the processor and main memory for generating graphics data and control signals, the GMCH being further connected to an input/output controller hub (ICH) that includes a universal serial bus (USB) controller connected to a USB port having a connector, a general purpose input/output (GPIO) port and a PCI controller, the ICH being further connected to a ROM BIOS;

means for determining whether the USB port has been disabled;

means for disabling the USB port if necessary;

a display device for displaying POST 80h codes generated during a boot up sequence of the computer, the POST 80h codes being output via the USB port of the computer; and the connection between the USB controller and USB port being used to communicate the POST 80h codes to a non-USB device so that the USB port does not need to be initialized until late in the boot up sequence.

2. The computer of claim 1 wherein the display device comprises a seven-segment display.

3. The computer of claim 1 wherein the ROM BIOS includes instructions for implementing a POST of the computer.

4. The computer of claim 1 wherein a data output line of the GPIO port is connected to a first data output line of the USB port, such that data output from the GPIO port is output on the first data output line of the USB port.

5. The computer of claim 4 wherein a clock output line of the GPIO port is connected to a second data output line of the USB port such that clock signals output from the GPIO port on the clock output line are output from the computer via the second data output line of the USB port.

6. A method of accessing POST 80h signals generated during a boot sequence of a computer, the method comprising:

providing a main memory and a processor;

connecting a graphics memory controller hub (GMCH) to the processor and the main memory for generating graphics data and control signals;

further connecting the GMCH to an input/output controller hub (ICH) that includes a universal serial bus (USB) controller connected to a USB port having a USB connector, a general purpose input/output (GPIO) port and a PCI controller, the ICH being further connected to a ROM BIOs such that data written to the GPIO port is output from the computer via the USB port;

connecting to the USB port a device for receiving data therefrom;

determining whether the USB port has been disabled, disabling the USB port if necessary;

during the boot sequence of the computer, writing the POST 80h signals to the GPIO port;

receiving the POST 80h signals using the device connected to the USB port; and the connection between the USB controller and the USB port being used to communicate the POST 80h codes to the device so that the USB port does not need to be initialized until late in the boot sequence.

7. The method of claim 6 further comprising storing the received POST 80h signals using the device connected to the USB port.

8. The method of claim 6 further comprising displaying the received POST 80h signals using the device connected to the USB port.

9. The method of claim 8 wherein the POST 80h signals are displayed on a seven-segment display.

10. The method of claim 6 where the ROM BIOS includes instructions for implementing a POST of the computer.

11. The method of claim 6 wherein a data output line of the GPIO port is connected to a first data output line of the USB port, such that data output from the GPIO port is output on the first data output line of the USB port.

12. The method of claim 11 wherein a clock output line of the GPIO port is connected to a second data output line of the USB port such that clock signals output from the GPIO port on the clock output line are output from the computer via the second data output line of the USB port.

13. The method of claim 6 wherein the ICH is connected to a plurality of PCI slots via the PCI controller.

* * * * *